Patented Mar. 15, 1949

2,464,205

UNITED STATES PATENT OFFICE 2,464,205

CATALYSIS OF HYDROCARBONS

John R. Bates, Swarthmore, Pa., assignor to Houdry Process Corporation, Wilmington, Del., a corporation of Delaware No Drawing. Original application December 23, 1939, Serial No. 310,762. Divided and this application May 20, 1947, Serial No. 749,343

9 Claims. (Cl. 196—52)

The present application is a division of my copending application Serial No. 310,762, filed December 23, 1939, now Patent No. 2,429,981, issued November 4, 1947, which in turn is a continuation-in-part of my application Serial No. 170,648, filed October 23, 1937 (now Patent No. 2,283,172, issued May 19, 1942).

It relates to contact masses, their preparation and use. More particularly, it is concerned with contact masses having selected and controlled properties suitable for use in fluid contacting operations to exert catalytic influence over, enter into, or in any way assist chemical or physical changes in which the fluid participates. It has to do with catalysts derived from materials having zeolitic or base exchange properties and particularly those materials which are prepared by wet methods.

Artificial base exchange bodies prepared, for example, from soluble silicates and other compounds, amphoteric and otherwise, have found wide usage in the treatment of water or for other purposes wherein the base-exchanging capacity of the zeolite is utilized. Many such zeolites have high adsorptive capacity which renders them valuable starting materials for the production of catalysts. Catalysts prepared from these zeolites, however, have often failed to have the expected activity or the ability to retain it in use especially to promote organic reactions, which leave burnable deposit thereon necessitating periodic regeneration by combustion of said deposit, as for example, in effecting catalytic decomposition of hydrocarbons, to yield products of the gasoline type. Such processes utilizing these contact materials have failed, from a commercial standpoint, to be equal to or better than processes effected with the aid of cheaper and quite satisfactory catalysts comprising or consisting of suitably prepared naturally occurring or mineral substances, such as clays and other ores.

One object of the present invention is to provide synthetic catalysts for promoting hydrocarbon conversions characterized by high activity and high stability. Another object is to improve hydrocarbon conversion processes. Another object is to obtain high yields of gasoline having high anti-knock rating and high stability. Another object is to make products of selected chemical nature with low formation of catalyst deposit. Other objects will be apparent from the detailed description which follows.

According to the invention, economical processes for transforming hydrocarbons giving high yields of particularly valuable products result from the use, as catalysts, of plural component synthetic materials derived from base exchange oxides prepared by wet methods under controlled pH within the range of 3 to 11 and consisting essentially of the nuclear components of the base exchange body in substantially unchanged proportion and molecular relation. These catalysts may contain some alkali metal but its amount must not exceed 1% by weight of sodium oxide or its stoichiometric equivalent.

These catalysts are made by base exchanging with a solution containing a volatile or heat unstable cation, a zeolite prepared from ingredients containing in addition to nuclear components a predetermined and controlled amount of one or more suitable anions. The quantity of the selected anion controls both the pH of the zeolite forming reactions and the extent to which alkali metal may be removed by the base exchange step. Anions capable of forming weak or strong acids are suitable with the exception of those containing amphoteric elements. Common anions well suited for the purpose of the present invention include $Cl^-$, $SO_3^=$, $SO_4^=$, $CO_3^=$, $C_2H_3O_2^-$. The anion may be presented to the reacting ingredients of the zeolitic gel, coagulum, or precipitate as an acid and/or as a salt. In some instances, the anion is present in suitable amount in the reacting ingredients of the zeolite as, for example, in combination with a cation, the oxide of which enters into the non-exchangeable or nuclear portion of the zeolite. This is exemplified by certain zeolites prepared by interreaction of solutions of sodium silicate and certain aluminum salts, e. g., aluminum sulphate, ammonium alum, aluminum chloride, aluminum acetate. In some cases it is necessary to add an additional quantity of an anion in order to have the alkali metal present in removable form. In other cases, there may be no suitable anions in the original reactants whereupon all the anions may be added in a separate solution. Such is the case when, for example, solutions of sodium aluminate and sodium silicate comprise the starting materials for the preparation of a zeolite. The anion-containing compound may then be mixed with the soluble silicate or with the amphoterate, or, after the manner disclosed in my copending application, Serial No. 174,966, filed November 17, 1937 (now Patent No. 2,283,172, issued May 19, 1942), the anion-containing solution may be added to a mixture of solutions containing the nuclear elements of the zeolite and have the additional function of coagulating the same. When the anion is deliberately added as an extra ingredient to the zeolite forming material it is preferably in the form of a volatile or heat unstable compound, the cation of which is capable of practically complete removal by a simple physical treatment such as heating, such for example, as volatile inorganic salts including ammonium chloride, volatile organic salts such, for example, as methylamine hydrochloride, unstable salts such as ammonium sulfate, nitrate, and carbonate, or volatile or unstable acids including hydrochloric acid, formic acid and acetic acid. Ammonium sulphate is the preferred addition agent. When this compound is added to a sol, for example, to act as coagulating agent the finished catalyst has higher activity in hydrocarbon conversions than catalysts obtained from alkaline reactants and any of the other coagulating or addition agents given above.

When the reacting solutions, including the anion-containing material, for forming a zeolite containing sodium, for example, are so proportioned that the pH of the mixture is below about 11, the sodium content of the zeolite may be reduced to 1% or less and often below .75% by base exchange with the selected cation, even when the original sodium oxide content of the zeolite is as high as approximately 7 to 9%. In most instances, when the pH of the reacting ingredients is about 10 or below, the sodium oxide content is easily reduced to 0.5% or below, while pH values below 9 permit reduction of the sodium oxide content to about 0.2% at which point the accepted methods of analysis become inadequate for accurate determination. This is considered equivalent to virtual exhaustion of the undesirable component.

The actual removal of sodium or other metallic component or constituent is effected by treating the zeolite with a solution incapable of dissolving nuclear substances by acid reaction and containing the base exchanging cation. The latter must be of a volatile or decomposable nature and susceptible of substantially complete removal from the nuclear substances by the application of heat. The solute may be, and preferably is, a compound which is also of a volatile or heat decomposable nature, as for example, compounds of ammonium, of amines and of other organic bases. The operation is simple, comprising only contacting the zeolite one or any desired number of times with a solution of the selected compound and may be made at any time after precipitation or coagulation, but preferably after drying and/or washing. A good operation results from the use of a salt which is neutral or practically neutral. Ammonium chloride is one of the best compounds for such use.

In most instances, no more than six, and, usually, four or fewer, successive dips of the zeolite in the chosen base exchanging solution of proper concentration are necessary to remove the desired or required amount of the non-nuclear component or constituent. The operation is efficiently and economically conducted when each dip of the precipitate or coagulum is made in approximately one half of its weight of a base exchanging solution comprising, for example, a 5% to 10% solution of ammonium chloride or a solution containing a stoichiometrically equivalent amount of the ammonium or another desirable volatile or unstable cation. Elevated or superatmospheric temperatures tend to increase the speed of the base-exchanging process. The quantities and concentrations of the base-exchanging solutions are not critical, and, as long as a sufficient amount of the desired cation is present satisfactory results are obtained with relatively larger amounts of more dilute and with relatively smaller amounts of more concentrated solutions. Likewise the number of dips required will usually vary inversely with the relative strength of the solution. Although successive dipping or batch treatment produces the desired result, for reasons of economy, in large scale treatment continuous countercurrent extraction to equivalent extent is utilized. Also, substantial economies in the quantity of base exchanging compound are realized when the precipitate or coagulum is washed free of excess quantities of the undesirable component or constituent and of other soluble substances, such as salts. Preferably, this washing is effected after drying the coagulum or precipitate and with suitably purified water which is free of the undesirable material.

The product resulting from the base exchanging step is a modified zeolite comprising the nucleus of the coagulum or precipitate substantially free of the base exchanging component or constituent originally held therein and zeolitically holding to the extent of its zeolitic capacity a base exchanged component or constituent susceptible of substantially complete removal by heat. The base exchanging step removes substantially none of the nuclear material. In no instance does the nucleus have associated therewith the original base exchanging material in an amount more than that equivalent to 1% by weight of sodium oxide and preferably contains below three fourths or even one half or less of that amount. It may contain as a zeolitic component or constituent, as much as approximately 5% by weight of the ammonium ion or radical or an equivalent amount of another volatile or heat unstable cation.

When the ultimate product is to be the original nucleus in substantially pure form, the modified zeolite is subjected to heat treatment to drive off its content of volatile or decomposable substance. For this purpose, the modified zeolite is simply heated to a temperature below that at which substantial depreciation of the desired catalytic properties of the nucleus takes place and is held at the selected temperature for a suitable and usually short period of time. When the modified zeolite comprises silica, alumina, and exchangeable ammonium, substantially all the ammonium is usually ejected when the zeolite is held at a temperature within the range of 700° or 1050° F. for a period of two hours or less. Higher temperatures may, however, be utilized, and it is characteristic of the catalysts embraced within the scope of the invention that they are exceptionally stable to heat, being capable of maintaining high activity for long commercial life involving frequent regenerations at combustion temperatures.

A predetermined and controlled amount of other material, including metals and metal oxides may be made a constituent or component of the finished catalyst. Such material may be inserted into the modified zeolite by base exchange in any desired quantity up to its full base exchange capacity. In order to make such contact masses, the modified zeolite, preferably in dried and washed form, is immersed one or more times in a solution containing cations of the desired metal or metal oxide in proper and regulated concentration. Accurate and rigid control over the amount of the additional material incorporated within the structure of the zeolite is attained through regulation of the strength of solution and of the number of immersions employed, the general tendencies being toward increased base exchange with higher concentrations and greater number of immersions. In this manner, any metallic element in the first to the eighth groups of the periodic table for example, Cu, Co, Ni, Fe, Mn, Cr, V, W, Li, Cs, Rb, Al, Ca, Sr, Ti, Mo, Mg, may become a constituent of the end product. Heat treatment of the modified zeolite following introduction thereinto of a metal constituent in zeolitic substitution for any desired portion of its content of volatile or decomposable material may thus produce a contact mass made up of the desired constituents or components in closely regulated proportionate amounts and substantially free of the original base exchanging component.

Gels prepared by coagulation of sols with a solution containing a volatile cation are of peculiar importance among the gelatinous materials suitable as starting materials for active and stable catalysts. These gels or coagulums are always alkaline when produced and are the only ones having pH values above about 8, as within the range of 9 to 11 which are susceptible of treatment to yield catalysts of optimum activity and stability. Full advantage in these respects is obtained from other gels, as exemplified by products obtained by interreaction of a soluble silicate and a salt of an amphoteric metal, or by coagulation with acid of a mixture or sol of the silicate and alkaline amphoterate solutions, when the gels are prepared at lower pH conditions, usually below 8 and preferably below 7, as within the range of 4 to about 7.

The invention is not limited to catalysts derived from two component nuclei. On the contrary, the stability, selective activity, or both, of synthetic catalysts may be further improved by inclusion of one or more additional selected components in the nucleus of the base exchange body. The presence of a desired and usually small quantity of thoria, beryllia, for example, intimately associated with silica and alumina in a base exchanging nucleus, or a difficultly reducible oxide of a metal of group IV of the periodic table, improves the stability of the resulting catalyst for promoting production of gasolines and the like from naphthas and higher boiling hydrocarbons. The effect of additional nuclear components becomes pronounced when made a part of the nucleus under pH conditions of about 8 or below and preferably 7 or less. In addition to maintaining high activity after many months of commercial scale operation involving as many as or more than 20 regenerations per day by burning of combustible deposit formed thereon, catalysts characteristic of the invention selectively promote formation of desired product with little tendency to form and accumulate contaminating deposit.

Over and above these advantages, which directly provide improved and more economical plant operation, there catalysts, despite being highly active in promoting splitting and kindred decomposition reactions, possess highly selective activity which direct the course of decomposition reactions toward products possessing a high degree of stability and marked anti-detonating characteristics. Motor fuels produced by their use under decomposition conditions, even without further purification, characteristically have high resistance to oxidation and other deteriorating influences encountered in storage and use, as measured, for example, by oxygen bomb induction periods, accelerated gum determinations, color stability tests, etc. In fact, there motor fuels are unique among those resulting from splitting and other decomposition reactions in that they possess the peculiar type of stability required of modern aviation gasolines and currently indicated by standardized acid heat or bromine number determinations. Utilizing a wide variety of charging stocks ranging from crude distillation residues to naphthas having boiling range characteristics of gasoline and including cracked and other naphthas of high acid heat, gasolines made according to the invention have acid heats of 60° F. and below and usually 40° F. or below.

The splitting reactions are preferably conducted in vapor phase. For most charging stocks catalyst temperatures within the range of 700 to 1050° F. are suitable, temperatures within the lower portions of the range, as up to 950° F. being usually employed for the transformation of high boiling hydrocarbons, and temperatures within the upper portion of the range, or 800° F. and higher, for kerosenes and other naphthas. It is preferable to employ comparatively low pressures, as from atmospheric up to 150 or 200 lbs. per sq. inch gauge. Pressures of about 30 lbs. per sq. inch gauge and up are of some advantage in transforming the more refractory naphthas and similar charging stocks, but it is preferred to use pressures below about 100 lbs. per sq. inch for transformation of higher boiling hydrocarbons such as gas oils and bottoms fractions. The feed rates for ordinarily liquid hydrocarbons usually lie within or above the range of 0.75 to 5 volumes of liquid charge to each volume of catalyst per hour, the tendency being toward higher rates for naphthas than for higher boiling stocks.

*Example I*

A silica-alumina zeolite was prepared from a solution of sodium silicate comprising about 900 parts by weight of a commercial water glass having a specific gravity of approximately 1.4 and about 2500 parts by weight of water by mixing it with an equal volume of a solution containing about 320 parts by weight of commercial ammonium alum and approximately 2800 parts by weight of water. Within a short time a gelatinous precipitate formed. This precipitate having a pH of the order of 8 was then dried and washed with purified water until practically free of sulphates. Upon analysis the resulting solid was found to comprise about 84.3% SiO$_2$, 11.7% Al$_2$O$_3$ and 4% Na$_2$O (anhydrous basis). It was then immersed for 30 minutes in one half its weight of a 10% solution of ammonium chloride maintained at a temperature of the order of 180° F., removed from the solution and washed with purified water. The immersion and succeeding washing steps were repeated three times and the resulting ammonium zeolite comprising the silica-alumina nucleus and approximately 2.3% by weight of the ammonium radical was divided into two portions.

One portion was heated to approximately 1050° F. and maintained at that temperature for about 2 hours, after which it was cooled and a sample subjected to chemical analysis. This material, found to consist of approximately 87.6% SiO$_2$, 12.1% Al$_2$O$_3$ and 0.3% Na$_2$O (anhydrous basis), was used as catalyst in a continuous process for the transformation of Coastal gas oil having the approximate boiling range of 420° to 720° F. into 410° F. end point motor fuel involving repeated cycles of transformation periods of about 15 minutes duration alternating with regeneration periods when the coke like by-products of the transformation reaction were burned off at temperatures in the range of 800° F. to 1050° F. During the on-stream periods, the catalyst was maintained at about 810° F. while the charge was fed to it at substantially atmospheric pressure and at the rate of about 1.25 (volumes of charge, liquid basis, to each volume of catalyst per hour). The yield of the fractionated gasoline, which had an octane rating of about 78, copper dish gum of about 3 mg. per 100 cc., an oxygen bomb induction period of more than 10 hours, and an acid heat below 40° F., was found to be about 40% by volume of the charge. The coky deposit, averaging about 1.5% by weight of the catalysts, was substantially completely removed in 10 minute burning periods.

The second portion was treated to prepare contact mass of the type disclosed and claimed in U. S. Patent No. 2,078,951 issued to Eugene J. Houdry on May 4, 1937, and containing about 0.75% Mn. To this end, it was immersed for 30 minutes in about twice its weight of a solution containing approximately 0.85 mols of $MnSO_4$ per liter and maintained at a temperature of the order of 180° F. The resulting zeolite containing manganese was washed until practically free of sulphates, subjected to a heat treatment similar to that described for the first portion of the ammonium zeolite. A sample was analyzed for manganese content, which was found to be about 0.78%. This material was used in a hydrocarbon transforming operation similar to that described above and produced motor fuel of about the same quality and quantity. During such use it was regenerated rapidly and substantially completely at temperatures in the range of 900 to 1000° F.

Example II

A gel containing silica and alumina in the molar ratio of approximately 17:1 was prepared by mixing a solution of commercial sodium silicate with a solution of aluminum sulfate and sufficient concentrated sulfuric acid to yield a gel having a pH value of the order of 6. After filtering, it was treated with ammonium chloride solution until its content of alkali metal was reduced to below 0.5% by weight of sodium oxide. After again washing, this material was heat treated at about 1050° F. for about 2 hours. The finished catalyst was then utilized to promote transformation of an East Texas gas oil having a boiling range of 420 to 720° F. This gas oil was fed in vapor form to the catalyst at a rate of about 1.5:1 (volumes of charge, liquid basis, to each volume of catalyst per hour) for an operating period of approximately 10 minutes while maintaining the catalyst at about 785° F. Upon fractionation, the products of this operation were found to contain a quantity of 400° F. end point gasoline equivalent to about 50% by volume of the charging stock. This gasoline had an octane rating of about 80 (CFR motor method), acid heat of about 40° F., copper dish gum substantially below 10 mg and an oxygen induction period over 10 hours. A portion of the catalyst was analyzed and the burnable deposit on it found to be approximately 1.8% by weight or about 12½ grams per liter. This deposit was substantially completely removed in a burning period of about 10 minutes, during which time the maximum catalyst temperature was maintained below 1100° F.

Example III

A multi-componet synthetic catalyst containing silica, alumina and beryllia in the approximate molar ratio of 17:1:0.5 was prepared in the following manner. A solution containing 70 parts by weight of beryllium sulfate, about 250 parts by weight of aluminum sulfate and of the order of 40 parts of concentrated sulfuric acid was mixed with a solution containing about 1450 parts of weight of commercial sodium silicate. The resulting gel, having a pH of the order of 5, was dried, washed and treated with ammonium chloride solution until its total sodium oxide content was reduced to below 0.5% by weight. The treated material, after washing and heat treatment at temperature of the order of 1050° F. for 2 hours, was utilized to promote transformation into anti-knock motor fuel of the same gas oil that was employed in Example II, the conditions of run being substantially the same as described in that example. The fractionated 400° F. end point gasoline resulting from this operation was found to amount to about 42% by volume of the gas oil charge and had an octane rating in excess of 75 (CFR motor method) along with the high stability, including acid heat below 60° F., which characteristically results from use of the invention. The coky deposit on the catalyst amounted to approximately .8% of it by weight or of the order of 5.5 grams per liter and was easily removed in a burning period at least as short as the on-stream or run period.

Each of the catalysts described in the foregoing examples maintained high selective activity in promoting formation of stable and antiknock motor fuels for long periods of continuous use under commercial operating conditions.

Other combinations of intimately associated oxides which have high activity and high stability in the production of high anti-knock motor fuels by splitting reactions include nuclei of base exchange material comprising intimately associated combinations of zirconia and alumina, zirconia and beryllia, beryllia and alumina, thoria and alumina, etc., prepared by coprecipitation or other reaction conducted in the wet under controlled pH conditions, preferably not in excess of about 8. From the viewpoint of cost of the catalyst, however, it is preferable to use silicious materials, and, in some instances, the presence of silica in the nucleus appears to favorably affect both the activity and stability characteristics of the catalyst. The preferred silicious catalysts are those in which the silica predominates, at least 4 mols of silica, for example, being present in the nucleus for each mol of other nuclear oxide. Very high stability and activity are obtained when at least 10, say 10 to 25 mols of silica are present for each mol of any other one oxidic constituent of the nucleus.

In order to facilitate regeneration it is preferable that the catalyst be presented to the reactants in the form of grains or shaped pieces of substantially uniform size and shape. To this end, the catalytic gel may be molded into cylinders, pellets or any other desirable shape at any desired stage of their manufacture or treatment.

In the interest of utilizing, unimpaired, the activity and stability of the synthetic catalytic product it is preferred that the molding operation be conducted without the aid of extraneous binding materials containing or comprising sodium or other alkali metal. One molding method which avoids the use of extraneous binders is that disclosed in United States Patent No. 2,146,718 to George R. Bond, Jr., dated February 14, 1939.

The high anti-knock rating, stability and other valuable properties of products of the invention are probably due to the fact that the selective catalysis promotes formation of stable branch chain paraffins to the exclusion, or substantially so, of reactions which terminate with the formation of olefines or which convert straight chains to ring compounds. The products, whether derived from naphthenic or paraffinic base starting materials are predominantly paraffinic with the branched chain paraffins preponderating, often in molar ratios as high as or higher than 4:1 over the straight chain compounds; in fact, their content of branch chain paraffins usually exceeds their content of any other type of hydrocarbon, and, in some instances, exceeds the total quantity of all other types of hydrocarbons found in the products. Their content of olefines is generally below 10 mol percent, and in many cases is as low as 2 to 4%.

When the charging stock contains refractory sulphur components, such components are converted into easily removable form, the resulting stable motor fuel often being capable of meeting market specifications for sulphur content and of passing accepted corrosion tests without being subjected to further purification, except possibly a suitable treatment to remove traces of hydrogen sulphide, for example, a light caustic wash. In addition, when the charge subjected to the selective splitting action of the catalyst is a naphtha, the resulting product having low acid heat and improved octane rating is more responsive than the charge to addition agents such as tetraethyl lead.

I claim as my invention:

1. In the catalytic transformation of hydrocarbons to produce high anti-knock motor fuels having acid heat not in excess of 60° F., the process of subjecting hydrocarbon starting material at decomposition temperature to the action of a synthetic catalyst obtained from a base exchange body prepared by inter-reaction of nuclear components in the wet and under acid pH condition, said catalyst consisting essentially of composited silica, alumina and beryllia as the nucleus of a base exchanged body which has been treated with a volatile cation-containing base exchanging solution until the original content of alkali metal of said body has been reduced to an amount less than that equivalent to 1% by weight of sodium oxide and heated to drive off the volatile cation introduced by said base exchanging solution.

2. In the catalytic transformation of hydrocarbons to yield decomposition products, the process of subjecting the hydrocarbon charging stock at reaction temperature to the action of a substantially pure synthetic blend of silica, alumina and beryllia, obtained by base exchanging a zeolite produced by drying a hydrous coprecipitate of silica, alumina and beryllia containing alkali metal, with a solution of a salt selected from the group ammonium salts and amino salts until the alkali metal content of said zeolite is practically completely removed and by heat treatment of the base exchanged zeolite at high temperature to drive off residual ammonium or amino cation.

3. In promoting hydrocarbon reactions, the process of preparing a zeolite from reactant solution of an alkali metal silicate, an aluminum salt and a beryllium salt so proportioned that the resulting gel has a pH value in the acid range, drying said gel to produce a dried zeolite, treating said zeolite with a solution of a salt containing a volatile cation until substantially all the alkali metal content of the zeolite is removed, subjecting the resulting base exchanged zeolite to heat treatment at a temperature in excess of 700° F. to drive off said volatile cation, and thereafter feeding to said zeolite higher boiling hydrocarbons to convert the same into lower boiling decomposition products.

4. The method of cracking hydrocarbons containing constituents boiling above the range of gasoline which comprises contacting said hydrocarbons under catalytic cracking conditions with a catalyst comprising a major proportion of silica and minor proportion of alumina and beryllia, said catalyst consisting substantially of pure nuclear components derived from a precipitated zeolite by reduction of its content of alkali metal by base exchange to below the amount equivalent to 1% by weight of sodium oxide, effected by treatment of said zeolite in dried condition with a solution of a salt providing a volatile cation and heating the treated zeolite to drive off said volatile cation.

5. Process for producing high anti-knock and stable motor fuels by promoting decomposition reactions in hydrocarbons boiling above the range of the desired motor fuel, which comprises subjecting such hydrocarbons to contact under catalytic cracking conditions with a catalyst composed essentially of a substantially pure nucleus of a precipitated base-exchange body containing as nuclear components silica, alumina and beryllia, obtained by eliminating substantially all non-nuclear components from the precipitated base-exchange body without substantially effecting the composition of its nucleus.

6. The hydrocarbon conversion process for the production of normally low boiling hydrocarbons which comprises introducing a hydrocarbon charge stock in vapor phase under catalytic cracking condition into contact with a catalyst resulting from the calcination of a body containing oxides of silicon, beryllium and aluminum, derived by treating a dried coprecipitate of silica, alumina and beryllia containing alkali metal components, with a solution of an ammonium salt whereby the alkali metal is substantially displaced.

7. The process which comprises subjecting hydrocarbon vapors at cracking temperature to the action of a catalyst resulting from treatment of a dried synthetic base exchange body containing as nuclear components silica, alumina and beryllia and containing base exchangeably held alkali metal with a solution containing a volatile cation until substantially the total alkali metal content of said base exchange body has been removed, followed by heat treatment of said body at sufficiently high temperature above 700° F. to drive off the volatile cation.

8. In the production of stable high anti-knock gasoline of low acid heat, the process which comprises cracking normally liquid hydrocarbon charge in vapor phase in the presence of a composite produced by the calcination of a coprecipitate of silica, alumina and beryllia containing alkali metal, in which alkali metal has been reduced by base exchange of the dry composite to an amount less than that equivalent to 1% by weight of sodium oxide.

9. Process of producing gasoline from hydrocarbon fractions heavier than gasoline comprising cracking such fractions in the presence of a catalyst consisting essentially of silica, alumina and beryllia prepared by calcination of a composite obtained by interaction of an alkali metal silicate, an aluminum salt and a beryllium salt, said salts providing an anion of a non-amphoteric element in an amount equivalent to at least 0.2 the total alkali metal oxide content of said alkali metal silicate, and removing alkali metal from the resulting composite by drying the same and then base exchanging the dried composite with a volatile cation.

JOHN R. BATES.

REFERENCES CITED

The following references are of record in the file of this patent:

UNITED STATES PATENTS

| Number | Name | Date |
|---|---|---|
| 1,728,732 | Jaeger | Sept. 17, 1929 |
| 2,281,919 | Connolly | May 5, 1942 |
| 2,347,648 | Thomas et al. | May 2, 1944 |